United States Patent
Buller et al.

(10) Patent No.: US 6,419,403 B1
(45) Date of Patent: Jul. 16, 2002

(54) SYSTEM AND METHOD FOR OPTICALLY COUPLING COMPONENT SERVICE INTERFACES

(75) Inventors: Steven J. Buller; Robert George Emberty; Craig Anthony Klein, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,547

(22) Filed: Jan. 4, 2000

(51) Int. Cl.[7] .................................................. G02B 6/36
(52) U.S. Cl. .............................. 385/88; 385/49; 385/89; 385/92; 385/93
(58) Field of Search ............................... 385/49, 88, 89, 385/92, 93

(56) References Cited

U.S. PATENT DOCUMENTS

| | | | |
|---|---|---|---|
| 4,890,894 A | 1/1990 | Kwa | 385/53 X |
| 5,204,866 A | 4/1993 | Block et al. | 372/27 |
| 5,319,509 A | 6/1994 | Michelson et al. | 360/77.03 |
| 5,471,304 A | 11/1995 | Wang | 356/358 |
| 5,475,215 A | 12/1995 | Hsu | 250/227.11 |
| 5,521,992 A * | 5/1996 | Chun et al. | 385/14 |
| 5,561,727 A * | 10/1996 | Akita et al. | 385/88 |
| 5,644,705 A | 7/1997 | Stanley | 395/183.6 |
| 5,712,463 A | 1/1998 | Singh et al. | 219/121.6 |
| 5,909,333 A | 6/1999 | Best et al. | 360/51 |
| 5,930,428 A | 7/1999 | Irwin et al. | 385/88 |
| 6,005,700 A * | 12/1999 | Pressler et al. | 359/172 |

* cited by examiner

*Primary Examiner*—Brian Healy

(57) ABSTRACT

A computer hard disk drive for a use in a redundant array of independent disk drives (RAID) is mounted in a drive carrier for insertion into a drawer in a storage subsystem. The drive carrier has a conventional drive connector on one end for interfacing with the host computer, and an aesthetic bezel on an opposite end. The disk drive has an external optical source and sensor extending from the drive circuit card. The optical source and sensor are located adjacent to the bezel. The bezel is provided with an small optical service interface hole that aligns with the optical source and sensor for accessing them therethrough. The interface hole allows a technician to monitor the drive via the optical source and sensor while the drive is in operation, or to service the drive without removing it from the subsystem drawer.

17 Claims, 2 Drawing Sheets

SYSTEM AND METHOD FOR OPTICALLY COUPLING COMPONENT SERVICE INTERFACES

BACKGROUND OF THE INVENTION

1. Technical Field

This invention relates in general to optical connectors and in particular to an optical connector for a data access and storage device. Even more particularly, the present invention relates to an optical coupling for interfacing with and servicing a computer hard disk drive in a redundant array of independent disk drives.

2. Description of Related Art

In some types of computer hard disk drive applications, the disk drives are provided in a redundant array of independent drives (RAID) for a storage subsystem. Each drive is loaded in a drive carrier and then mounted in a drawer in the subsystem. The drives are typically provided with a service interface on one end that is accessible only when the drive is not mounted in the carrier. As depicted in FIG. 1, the drive 11 has a maintenance and/or service interface 13 that is usually provided via a conventional RS232 connector. A universal asynchronous receiver transmitter 12 (UART) provides RS232 capability for downloading debug information, new microcode, etc.

However, when the drives are installed in the RAID drawer, the service interface 13 is not externally accessible due to the presence of the carrier 15 (FIG. 2). Carrier 15 has a front bezel 17 that is provided for aesthetic purposes. If a drive were to require external diagnosis or service, the drive must be removed from the drawer. Unfortunately, any volatile failure information contained in the drive at the service interruption would be lost when the drive is removed. Thus, a need exists to create an externally accessible, disk drive interface that is also inconspicuous for aesthetic purposes.

SUMMARY OF THE INVENTION

A computer hard disk drive for a use in a redundant array of independent disk drives (RAID) is mounted in a drive carrier for insertion into a drawer in a storage subsystem. The drive carrier has a conventional drive connector on one end for interfacing with the host computer, and an aesthetic bezel on an opposite end. The disk drive has an external optical source and sensor extending from the drive circuit card. The optical source and sensor are located adjacent to the bezel. The bezel is provided with an small optical service interface hole that aligns with the optical source and sensor for accessing them therethrough. The interface hole allows a technician to monitor the drive via the optical source and sensor while the drive is in operation, or to service the drive without removing it from the subsystem drawer.

Accordingly, it is an object of the present invention to provide an improved optical connector.

It is an additional object of the present invention to provide an optical connector for a data access and storage device.

It is yet another object of the present invention to provide an optical coupling for interfacing with and servicing a computer hard disk drive in a redundant array of independent disk drives.

DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
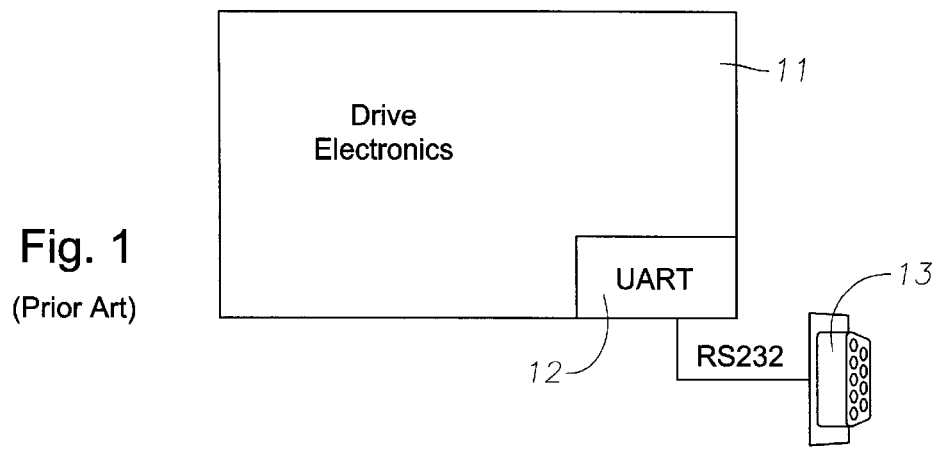
FIG. 1 is a schematic top view of a prior art hard disk drive.
Figure 2:
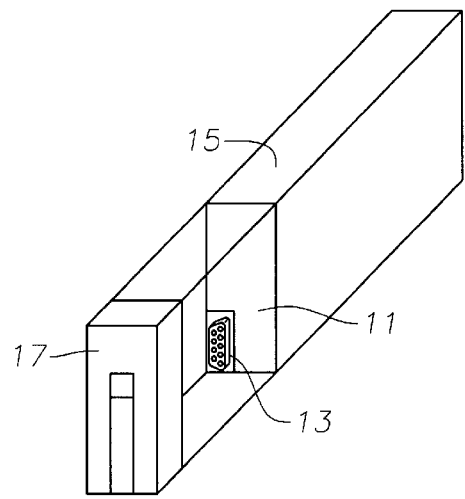
FIG. 2 is a schematic isometric view of the prior art drive of FIG. 1 mounted in a prior art drive carrier.
Figure 3:
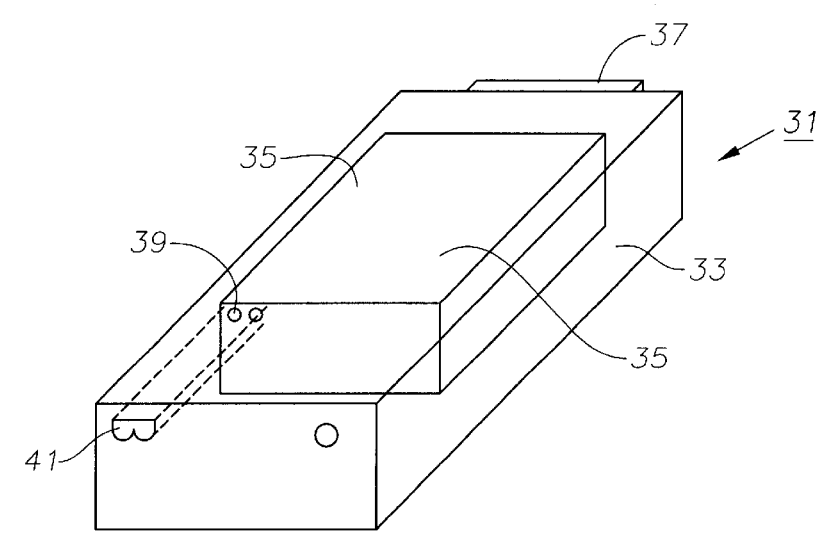
FIG. 3 is a schematic isometric view of a first embodiment of a hard drive constructed in accordance with the invention.
Figure 5:
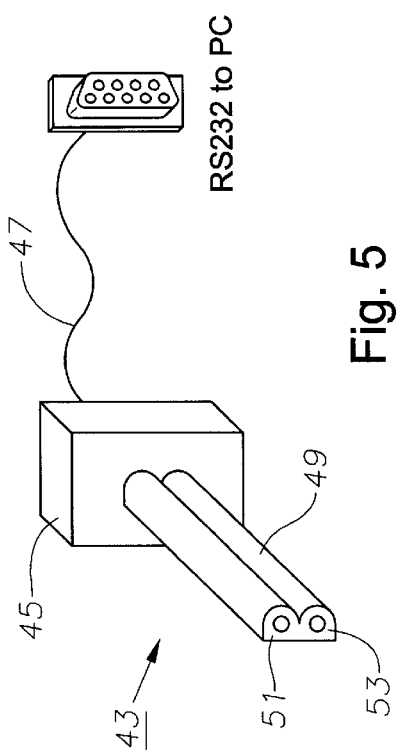
FIG. 5 is an enlarged, schematic isometric view of an optical probe for the drive and drive carrier of FIGS. 3 and 4.
Figure 4:
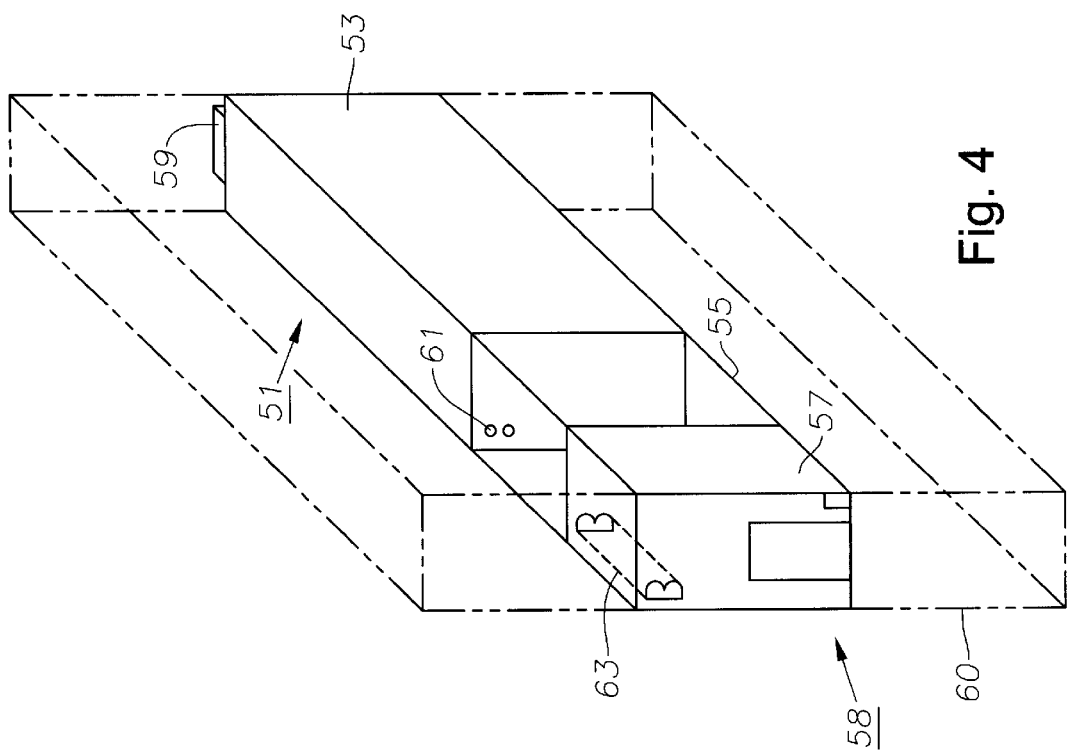
FIG. 4 is a schematic isometric view of a second embodiment of the drive of FIG. 3 mounted in a drive carrier.

Referring to FIGS. 3–5, a system and method for optically coupling component service interfaces is shown. For purposes of illustration, a data access and storage device such as a computer hard disk drive 31 (FIG. 3) is described. However, the system and method of the present invention may also be applied to various other components as well, such as a computer mainframe, tape drives, solid state memory, and optical devices. Disk drive 31 has a body 33 containing a drive circuit card 35 and other electrical devices such as those commonly known in the art for accessing and storing data. A drive interface connector 37, such as a small computer system interface (SCSI) connector, is electrically interconnected and mounted to drive 31 for interfacing with a host computer adjacent to a rear end of drive 31.

Drive 31 also has a small optical connector or source and sensor pair 39 mounted to circuit card 35 inside body 33. In the embodiment shown, optical source and sensor pair 39 is located opposite SCSI connector 37, adjacent to the front end of drive 31. In the preferred embodiment, pair 39 comprises an LED and a phototransistor for a driver and a receiver, respectively. The optical source and sensor pair 39 are interconnected with drive 31 so as to provide an RS232-type interface with drive 31. The LED of pair 39 provides optical output signals, and the phototransistor of pair 39 receives optical input signals. In addition, the front end on body 33 of drive 31 has a small keyed hole 41 extending therethrough that aligns with optical source and sensor pair 39. Hole 41 may comprise many different shapes, but is shown in a generally B-shaped configuration.

Referring now to FIG. 5, an external optical probe 43 for drive 31 is shown. Optical probe 43 has a base 45 from which extends an RS232-type connector 47 for interfacing with a maintenance and/or service personal computer. An elongated shaft 49 also extends from base 45. Shaft 49 has a generally B-shaped profile when viewed from the end, but may be provided in other shapes as well. In the embodiment shown, an LED 51 and a phototransistor 53 are mounted to the end of shaft 49, and are interconnected with connector 47.

In operation, drive 31 may be monitored or serviced via optical source and sensor pair 39 without removing drive 31 from its host computer, or interrupting its operation in any manner. A technician inserts the shaft 49 of probe 43 into hole 41 in body 33. The shapes of shaft 49 and hole 41 are perfectly complementary in shape, and are keyed in such a manner so as to prevent misinsertion and/or misalignment. When base 45 of probe 43 abuts body 33 of drive 31, the LED 51 and phototransistor 53 of probe 43 are perfectly aligned with and in close proximity to the phototransistor and LED of optical source and sensor pair 39, respectively. The technician can then exchange information with drive 31 via the optical connection.

Referring now to FIG. 4, a second embodiment of the invention is shown as a hard disk drive assembly 51 comprising a disk drive 53 mounted in a carrier 55 having a cosmetic bezel 57. Carrier 55 is adapted to be mounted in the drawer 60 of a storage subsystem 58. Assembly 51 is ideally suited for use in a redundant array of independent disk drives (RAID) (shown in dashed lines) for a host computer. Drive 53 electrically interfaces with the host computer via an electrical connector 59, such as a SCSI device. Like drive 31, drive 53 is provided with an optical source and sensor pair 61, and bezel 57 is provided with a small keyed hole 63. Pair 61 and hole 63 are identical to their predecessors.

Likewise, in operation, drive assembly 51 may be monitored or serviced via optical pair 61 without removing drive 53 from its host computer, or interrupting its operation in any manner. A technician inserts the shaft 49 of probe 43 (FIG. 5) into hole 63 in bezel 57. The shapes of shaft 49 and hole 63 are complementary in shape. When base 45 of probe 43 abuts bezel 57, the LED 51 and phototransistor 53 of probe 43 are perfectly aligned with and in proximity to the phototransistor and LED of optical source and sensor pair 61, respectively. The technician can then exchange information with drive 53 via the optical connection. Note that probe 43 may be used to access all of the drives in the array of drives.

The invention has several advantages including the use of reliable, optically-linked sources and sensors to provide a substantially equivalent, RS232-type interface with a disk drive, particularly within a redundant array of independent disk drives. The interface allows access to the drive without unit removal or service interruption. In addition, the interface hole in the drive and/or bezel is very small and inconspicuous. Consequently, the presence of the optical pair on the drive is undetectable and inaccessible except by the specially designed probe. Moreover, the probe and the hole are keyed to prevent misalignment. This invention provides a low cost, electrically nonobtrusive alternative that eliminates bent pins and poor connector interfaces.

While the invention has been shown or described in only some of its forms, it should be apparent to those skilled in the art that it is not so limited, but is susceptible to various changes without departing from the scope of the invention.

What is claimed is:

1. A system for optically coupling components to one another, comprising:
   a first component having a circuit card;
   an optical interface mounted to the first component and interconnected with the circuit card for processing optical signals therebetween;
   a portable optical probe external to the first component and being movable to an interface position wherein the optical probe is in close proximity to the optical interface for interfacing therewith, the optical probe being adapted to be interconnected with a second component for interfacing with the first component; and wherein the first component is a computer hard disk drive.

2. A system for optically coupling components to one another, comprising:
   a first component having a circuit card;
   an optical interface mounted to the first component and interconnected with the circuit card for processing optical signals therebetween;
   a portable optical probe external to the first component and being movable to an interface position wherein the optical probe is in close proximity to the optical interface for interfacing therewith, the optical probe being adapted to be interconnected with a second component for interfacing with the first component; and wherein the optical interface and the optical probe each provide interfacing capabilities that are substantially equivalent to the interfacing capabilities of an RS232-type interface.

3. The system of claim 1 wherein the optical interface and the optical probe each comprise an LED and a phototransistor.

4. A method for interfacing components, comprising:
   (a) providing a first component with a circuit card and an optical interface that is interconnected with the circuit card for processing optical signals therebetween;
   (b) interconnecting an optical probe with a second component;
   (c) orienting the optical probe in an interface position wherein the optical probe is in close proximity to the optical interface for coupling therewith, such that the second component interfaces with the first component; and wherein step (c) comprises:
   coupling the optical interface and the optical probe in a manner that is substantially equivalent to interfacing through an RS232-type interface.

5. The method of claim 4, further comprising the step of providing each of the optical interface and the optical probe with an LED and a phototransistor for sending and receiving data, respectively.

6. A disk drive assembly, comprising:
   a disk drive having a body and a circuit card with electrical devices for accessing and storing data therein;
   an electrical connector mounted on the body and electrically interconnected with the circuit card, the electrical connector being adapted to interface with a host computer;
   an optical interface mounted to the disk drive and located internally within the body, the optical interface being interconnected with the circuit card for processing optical signals therebetween;
   an optical probe external to the disk drive and being movable to an interface position wherein the optical probe is in close proximity to the optical interface for interfacing therewith inside the body of the disk drive, the optical probe being adapted to be interconnected with a personal computer for interfacing with the disk drive; and wherein
   the optical interface provides interfacing capabilities that are substantially equivalent to the interfacing capabilities of an RS232-type interface.

7. The disk drive assembly of claim 6 wherein the body of the disk drive is a carrier that is adapted to be inserted into a RAID drawer.

8. The disk drive assembly of claim 6 wherein the electrical connector is mounted to a rear end of the body and the optical interface is mounted adjacent to a front end of the body.

9. The disk drive assembly of claim 6 wherein the optical interface and the optical probe each comprise an LED and a phototransistor.

10. The disk drive assembly of claim 6 wherein the probe further comprises an RS232-type interface that is adapted to interconnect the disk drive to a personal computer via the optical interface.

11. A disk drive assembly, comprising:

a carrier having a rear end, a front bezel, and an aperture in the front bezel, the carrier being adapted to be mounted in a RAID drawer;

a disk drive mounted to the carrier and having a circuit card with electrical devices for accessing and storing data therein;

an electrical connector extending from the rear end of the carrier and electrically interconnected with the circuit card, the electrical connector being adapted to interface with a host computer for a storage subsystem;

an optical interface mounted to the disk drive and located inside the carrier adjacent to the front bezel, the optical interface being interconnected with the circuit card for processing optical signals therebetween, wherein the optical interface is aligned with the aperture in the front bezel;

an optical probe external to the carrier and being movable to an interface position wherein the optical probe is inserted into the aperture in the front bezel and in close proximity to the optical interface for interfacing therewith inside the carrier, the optical probe having an RS232-type interface that is adapted to be interconnected with a personal computer for interfacing with the disk drive via the optical interface; and wherein the optical interface provides interfacing capabilities that are substantially equivalent to the interfacing capabilities of the RS232-type interface of the optical probe.

12. The disk drive assembly of claim 11 wherein the optical interface and the optical probe each comprise an LED and a phototransistor.

13. The disk drive assembly of claim 11 wherein the probe is keyed to the aperture in the front bezel of the carrier to prevent misalignment therebetween.

14. A method for interfacing with a disk drive assembly, comprising:

(a) providing a disk drive with a circuit card and an internal optical interface that is interconnected with the circuit card for processing optical signals therebetween;

(b) inserting an optical probe into the disk drive to an interface position wherein the optical probe is in close proximity to the optical interface for interfacing therewith inside the disk drive;

(c) interconnecting the optical probe with a personal computing device for interfacing with the disk drive in a manner that is substantially equivalent to interfacing through an RS232-type interface.

15. The method of claim 14 wherein step (a) comprises mounting the disk drive in a RAID drawer.

16. The method of claim 14 wherein step (b) comprises inserting the optical probe through an aperture in a bezel on a front side of the disk drive.

17. The method of claim 14 wherein step (a) comprises providing each of the optical interface and the optical probe with an LED and a phototransistor for sending and receiving data, respectively.

* * * * *

UNITED STATES PATENT AND TRADEMARK OFFICE
CERTIFICATE OF CORRECTION

PATENT NO. : 6,419,403 B1
DATED : July 16, 2002
INVENTOR(S) : Buller et al.

It is certified that error appears in the above-identified patent and that said Letters Patent is hereby corrected as shown below:

<u>Title page,</u>
*Primary Examiner*, please add
-- *Attorney, Agent, or Firm*—Bracewell & Patterson, L.L.P. --

Signed and Sealed this

Twenty-first Day of October, 2003

JAMES E. ROGAN
*Director of the United States Patent and Trademark Office*